(12) United States Patent
Baudru et al.

(10) Patent No.: US 9,150,148 B2
(45) Date of Patent: Oct. 6, 2015

(54) ON-BOARD LIGHTING DEVICE IN A MOTOR VEHICLE AND RELATED METHOD FOR CONTROLLING A LIGHT SOURCE

(71) Applicants: CONTINENTAL AUTOMOTIVE FRANCE, Toulouse (FR); CONTINENTAL AUTOMOTIVE GmbH, Hannover (DE)

(72) Inventors: Stephan Baudru, Pins Justaret (FR); Maxime Cordier, Toulouse (FR); Cyril Robin, Villeneuve Tolosane (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 12 days.

(21) Appl. No.: 14/088,666

(22) Filed: Nov. 25, 2013

(65) Prior Publication Data
US 2014/0145611 A1    May 29, 2014

(30) Foreign Application Priority Data
Nov. 26, 2012 (FR) ...................................... 1261238

(51) Int. Cl.
| B60Q 1/14 | (2006.01) |
| B60Q 1/26 | (2006.01) |
| B60Q 3/02 | (2006.01) |
| H05B 33/08 | (2006.01) |
| H05B 39/04 | (2006.01) |

(52) U.S. Cl.
CPC ............ *B60Q 1/2619* (2013.01); *B60Q 1/2669* (2013.01); *B60Q 3/0233* (2013.01); *B60Q 3/0293* (2013.01); *B60Q 3/0296* (2013.01); *H05B 33/0854* (2013.01); *H05B 39/04* (2013.01)

(58) Field of Classification Search
CPC ..... B60Q 3/0293; B60Q 11/005; B60Q 1/387
USPC ............................................ 315/77, 180, 280
See application file for complete search history.

(56) References Cited

U.S. PATENT DOCUMENTS 4,942,393 A * 7/1990 Waraksa et al. .............. 340/5.62
5,497,306 A   3/1996 Pastrick
(Continued)

FOREIGN PATENT DOCUMENTS

| EP | 1609674 A1 | 12/2005 |
| WO | 0225842 A2 | 3/2002 |
| WO | 2006111689 A1 | 10/2006 |

OTHER PUBLICATIONS

French Search Report, dated Aug. 21, 2013, from corresponding FR application.

*Primary Examiner* — Dylan White
(74) *Attorney, Agent, or Firm* — Young & Thompson

(57) ABSTRACT

Disclosed is a lighting device (D') on a motor vehicle, including: at least one light source (D1, D2, D3, D4) controlled by a pulse-width modulated lighting signal (PWM'); and a body controller module (10) generating the lighting signal (PWM') linked to the light source and, to at least one sensor (100, 200, 300, 400) detecting the approach and/or contact of the user's hand. The device includes a switching element (S1, S2, S3, S4) located between the detection sensor and the light source. The detection sensor includes: receiving and a processing element (101, 201, 301, 401) of the lighting signal; and a control element (102, 202, 302, 402) of the switching element, linked electrically firstly to the receiving and processing element, and secondly to the light source via the switching element. Also disclosed is a method for controlling the light source.

20 Claims, 3 Drawing Sheets

(56) References Cited

U.S. PATENT DOCUMENTS

2007/0195542 A1* 8/2007 Metros et al. ............... 362/501
2013/0002141 A1* 1/2013 Lee ............................. 315/152
2013/0307610 A1* 11/2013 Salter et al. ................. 327/517

* cited by examiner

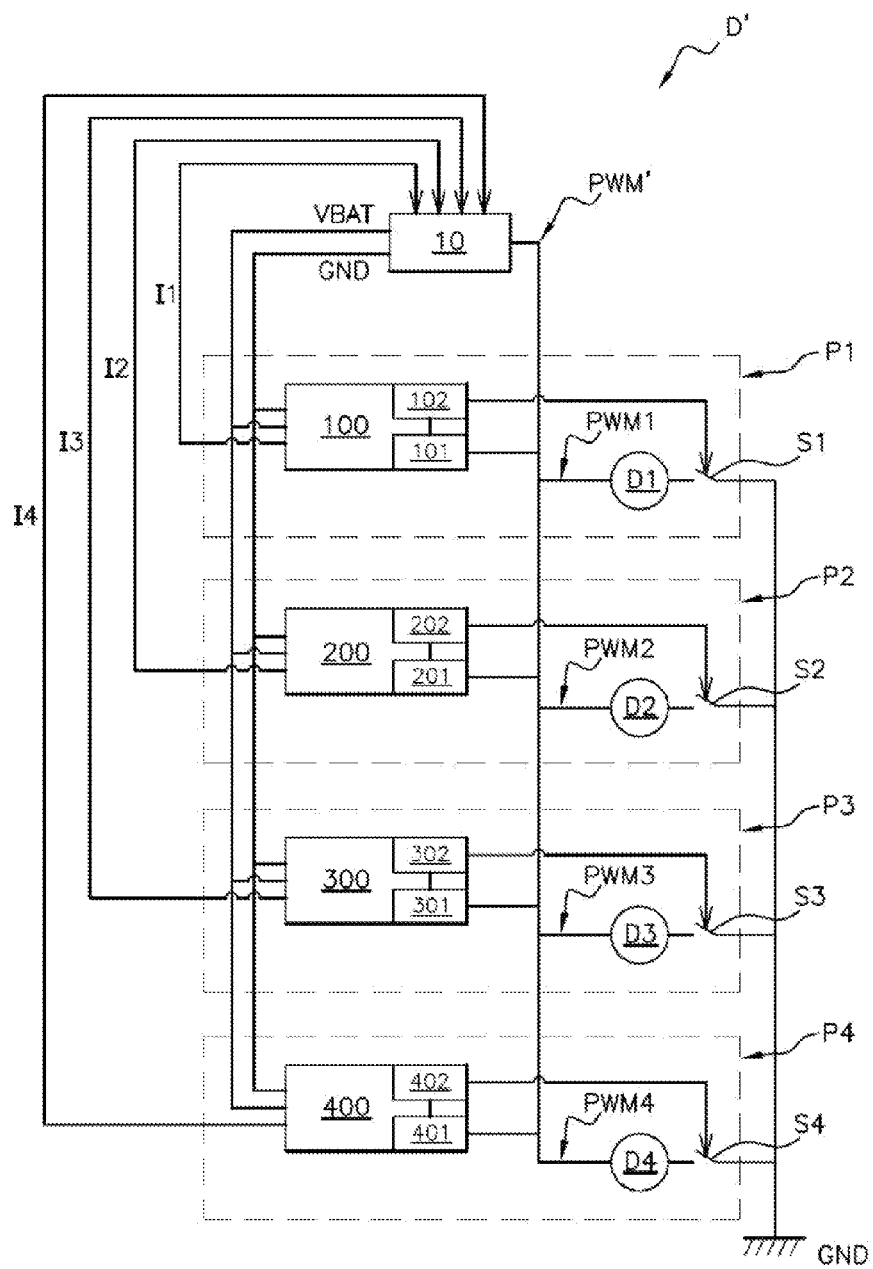

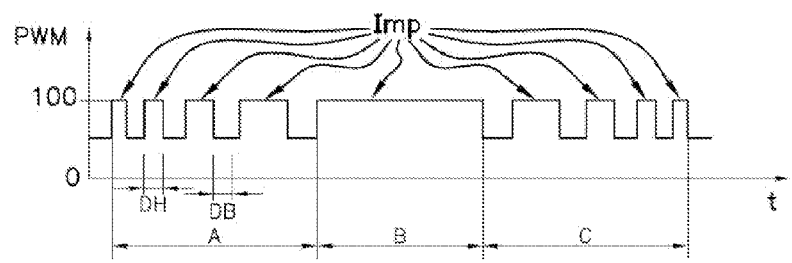
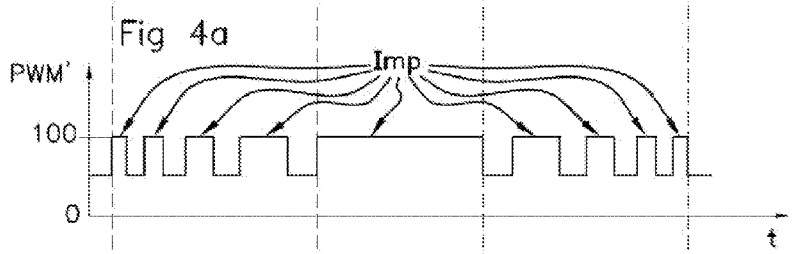
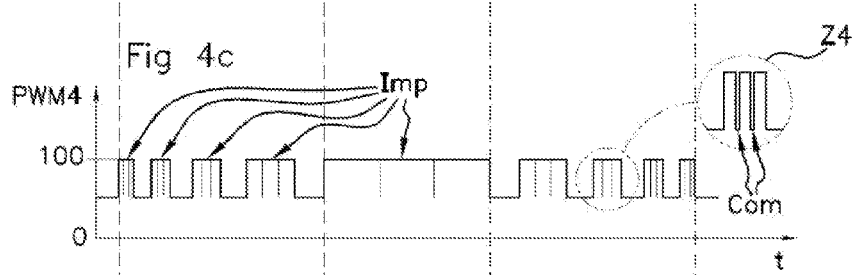
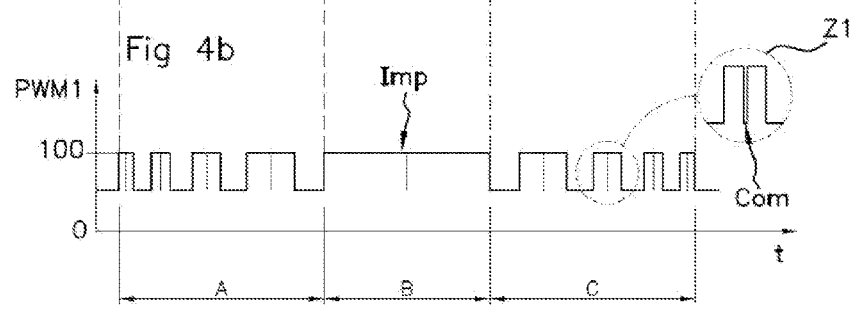

ON-BOARD LIGHTING DEVICE IN A MOTOR VEHICLE AND RELATED METHOD FOR CONTROLLING A LIGHT SOURCE

BACKGROUND OF THE INVENTION

1. Field of the Invention

The invention relates to an on-board lighting device in a motor vehicle and a related method for controlling a light source.

2. Description of the Related Art

Nowadays, motor vehicle door handles are fitted with devices for detecting the presence of a user, i.e. the approach and/or contact of the user's hand. Detection of the presence of a user coupled with recognition of an electronic "hands-free" badge for remotely controlling access to the vehicle that is carried by this user enables the doors of the vehicle to be locked and unlocked remotely. Thus, when the user carrying the corresponding electronic badge that has been identified by the vehicle approaches the handle or touches the door handle of his vehicle, the doors of the vehicle are automatically unlocked. By approaching or pressing a specific point on the door handle of the vehicle, referred to as the "unlocking zone", the door opens without having to unlock it manually. Conversely, when the user, still carrying the necessary badge identified by the vehicle, wishes to lock his vehicle, he closes the door of his vehicle and approaches or momentarily presses another specific point of the handle, referred to as the "locking zone". This gesture enables the doors of the vehicle to be locked automatically.

Presence detection devices usually include two capacitive sensors, in the form of two electrodes linked electrically to a printed circuit and built into the handle, each one in a specific locking or unlocking zone. Generally, one electrode is dedicated to each zone, i.e. one electrode is dedicated to detecting the approach and/or contact of the user's hand on the locking zone and one electrode is dedicated to detecting the approach and/or contact of the user's hand on the unlocking zone. These detection devices work as follows:
- one electrode, when energized, emits an electrical field that defines a detection zone (locking or unlocking zone),
- the approach of the user's hand to this detection zone disturbs this electrical field and modifies the capacitance at the terminals of said electrode,
- measuring the variation in this capacitance then makes it possible to detect the approach of the user's hand in said zone, in this case towards the handle,
- once this detection has been performed, the capacitive sensor then sends an unlocking/locking instruction to the unlocking/locking system of the door.

These presence and/or approach detection devices are usually built into a module, located in the door handle and also comprising a radio frequency antenna, used to recognize the "hands-free" access badge carried by the user, as well as one or more light sources illuminating certain specific zones of the vehicle or of the handle. It is common for each door handle of the vehicle to be fitted with such a light source.

These light sources are usually, on account of their compactness and resistance to vibrations, light-emitting diodes (LEDs), preferably white in color. Depending on the applications, these white light-emitting diodes illuminate the locking/unlocking zones of the handle in which they are located, in order to guide the user towards these zones:
- if an authorized hands-free access badge has been recognized near to the vehicle, or
- alternatively to confirm to the user that his presence has been detected, once he has moved his hand close to these locking/unlocking zones.

Illuminating and extinguishing these diodes is controlled by a body controller module (BCM) on board the vehicle. The body controller module is an electronic processor that receives data from different sensors located on the vehicle, in this case receiving user presence detection information from the presence detection sensors located in the door handles of the vehicle. As a function of this information, for example, the body controller module decides to illuminate and/or extinguish the light-emitting diode located in the handle near to which the user's presence has been detected. The body controller module, the presence detection sensors and the light-emitting diodes form a lighting device carried on board the vehicle.

However, a major problem with diodes is that, even when they come from the same production line, they have different luminous intensities (expressed in millicandelas, mcd). This variability in luminous intensity comes from the method used to manufacture the light-emitting diodes themselves. Luminous intensity can vary from, for example, 1500 mcd, to nearly double that, for example 2800 mcd, for two light-emitting diodes from the same production line.

This variation in luminous intensity is such that a user can see it on a vehicle fitted with several diodes. For example, if the vehicle is fitted with light-emitting diodes on each door handle, since it is particularly easy to compare luminous intensity between two handles located on the same side of the vehicle, if the difference in luminous intensity between these two light-emitting diodes is visible, the user of the vehicle is liable to think that the dimmer diode is faulty. However, this is not the case.

One solution to this problem is to select the light-emitting diodes at the end of the production line, sort them into classes according to the luminous intensity thereof, then fit the vehicle with diodes all taken from the same class. However, this solution is very expensive in terms of time and the logistics are complicated.

Another solution involves fitting the vehicle with light-emitting diodes from different classes, then paring them on the vehicle, adding a resistor to each diode as a function of the luminous intensity class thereof. The resistor modifies the intensity of the charge flowing through the light-emitting diode, enabling the luminous intensity to be corrected by imposing a fixed value thereon, that is the same for all of the light-emitting diodes fitted to a given vehicle. In this case, the simplest solution available is to select resistors that make it possible to obtain the luminous intensity of the class having the lowest intensity of all of the diodes.

FIG. 1 shows a lighting device D in the prior art carried on board a motor vehicle (not shown).

The lighting device D includes:
- a body controller module 10, connected electrically:
  - firstly to four approach and/or contact detection sensors 100, 200, 300, 400 arranged in parallel, in order to supply them with a current (VBAT) and connect them to ground (GND),
  - and secondly to four light-emitting diodes D1, D2, D3, D4 arranged in parallel, each being connected in series to a regulating resistor R1, R2, R3, R4, itself connected to ground.

Each set comprising an approach and/or contact detection sensor 100, 200, 300, 400, a diode D1, D2, D3, D4 and a related resistor R1, R2, R3, R4 is built into a vehicle door handle P1, P2, P3, P4.

The body controller module 10 powers the approach and/or contact detection sensors 100, 200, 300, 400 and receives information I1, I2, I3, I4 as feedback from these latter relating to detection of the approach and/or contact of a user near to the locking/unlocking zones. On receipt of this information I1, I2, I3, I4, the body controller module 10 then sends a lighting signal using pulse-width modulation (PWM) to the four diodes D1, D2, D3, D4 located in the door handles P1, P2, P3, P4 of the vehicle in order to illuminate or extinguish them, as applicable. This PWM lighting signal is shown in FIG. 3. It involves a succession of changes from a low state DB (0%) to a high state DH (100%), and changes from a high state (100%) to a low state (0%), also known as pulses Imp (see FIG. 3). Such signals usually have three phases:
- a progressive illumination phase A, to progressively illuminate the diode D1, D2, D3, D4, during which the durations of the high state, DH increase progressively,
- a continuous illumination phase B of the diode D1, D2, D3, D4, during which the PWM signal is constantly in the high state DH, and
- a progressive extinction phase C, during which the durations of the high state DH are progressively reduced, in order to progressively extinguish the diode D1, D2, D3, D4.

As with all pulse-width modulation (PWM) signals, the ratio between the durations of the high states DH and the durations of the low states DB determines a duty cycle:

$$Rc = \frac{DH}{DB}$$

The intensity of this lighting signal PWM is modified differently through each diode D1, D2, D3, D4 through the presence of the resistors R1, R2, R3, R4. The value of the resistors R1, R2, R3, R4 is selected as a function of the luminous intensity class of each diode D1, D2, D3, D4, in order to obtain four diodes having substantially equal luminous intensity.

This solution has several drawbacks:
- this solution is complicated, since it requires the luminous intensity class of each diode D1, D2, D3, D4 fitted to the vehicle to be known, and a dedicated resistor R1, R2, R3, R4 needs to be physically paired with each diode, by means of an additional manual operation on the production line,
- the logistics are difficult because the number of diodes produced in each class needs to be forecast in order to order an equal number of corresponding resistors,
- sorting at the end of the production line is costly. In order to reduce the cost of this sorting, it is essential to reduce the number of classes, for example to four or five classes. Consequently, this means only four or five resistors paired with these classes. This reduced number of resistors is insufficient to cover the variation in luminous intensity that still exists within a single class. Therefore, there remains a risk of differences in the luminous intensity of the diodes located on the vehicle, which remain visible to the user.

BRIEF SUMMARY OF THE INVENTION

The invention is intended to overcome these drawbacks.
The invention proposes a lighting device carried on board a motor vehicle, said device comprising:
- at least one light source controlled by a pulse-width modulated lighting signal,
- a body controller module generating said pulse-width modulated lighting signal, connected electrically:
  - to the light source and,
  - to at least one sensor detecting the approach and/or contact of a user's hand, said device being characterized in that it includes:
- switching means located between the approach and/or contact detection sensor and the light source, and in that the approach and/or contact detection sensor includes:
- receiving and processing means receiving the pulse-width modulated lighting signal from the body controller module,
- control means for the switching means, connected:
  - firstly to the receiving and processing means, and
  - secondly to the light source via switching means.

Thus, according to the invention, each approach and/or contact detection sensor:
- receives the lighting signal from the body controller module and,
- is linked electrically to a light source, to control it, via switching means.

Preferably, the switching means include a switch and the light source is a light-emitting diode.

More specifically, the approach and/or contact detection sensor, the light source and the switching means are built into a vehicle door handle.

The receiving and processing means and the control means of the switching means may be built into a microcontroller.

The invention also relates to a method for controlling a light source, using the lighting device having the features described above. The method includes the following steps:
a) Using the receiving and processing means to store a switching frequency and a switching duty cycle of the lighting signal, both predetermined to obtain a desired luminous intensity.
b) Using the body controller module to send a pulse-width modulated lighting signal, having a pulse frequency and a rated voltage, to the processing means and to the light source,
c) Receiving the lighting signal via the receiving and processing means,
d) Activating the switching means using the control means, according to the switching frequency and switching duty cycle stored in order to control the light source.

Judiciously, the switching frequency is higher than the pulse frequency. Preferably, this frequency may be at least ten times greater than the pulse frequency.

According to a specific embodiment of the invention, the switching frequency and the pulse duty cycle are determined during a prior calibration phase comprising the following steps:
e) Determination of a desired luminous intensity value,
f) Measurement at a reference power supply voltage value of a luminous intensity for each light source from a plurality of light sources as a function of the variation of the switching frequency and of the variation of the switching duty cycle of the lighting signal,
g) Storage in the processing means associated with each light source of a given switching frequency and of a given switching duty cycle to obtain the desired luminous intensity.

Advantageously, the desired luminous intensity is equal to the lowest luminous intensity measured from the plurality of light sources.

In a specific embodiment, step c of the control method also includes the correction, at the rated voltage value, of the switching frequency and of the switching duty cycle previously determined during step f at a reference power supply voltage value.

BRIEF DESCRIPTION OF THE DRAWINGS

Other objectives, features and advantages of the invention are set out in the description below, given by way of non-limiting example, and in the attached drawings, in which:

FIG. 2 is a schematic representation of the lighting device D' according to the invention, FIG. 3, as explained above, shows, as a function of time t, the pulse-width modulated lighting signal outputted from the body module to the diodes, according to the prior art, FIG. 4a shows, as a function of time t, the pulse-width modulated lighting signal outputted from the body module, according to the invention FIG. 4b shows, as a function of time t, the pulse-width modulated signal at the input of the first diode D1, according to the invention, FIG. 4c shows, as a function of time t, the pulse-width modulated signal at the input of the fourth diode D4, according to the invention,

DETAILED DESCRIPTION OF THE PREFERRED EMBODIMENTS

Figure 1:
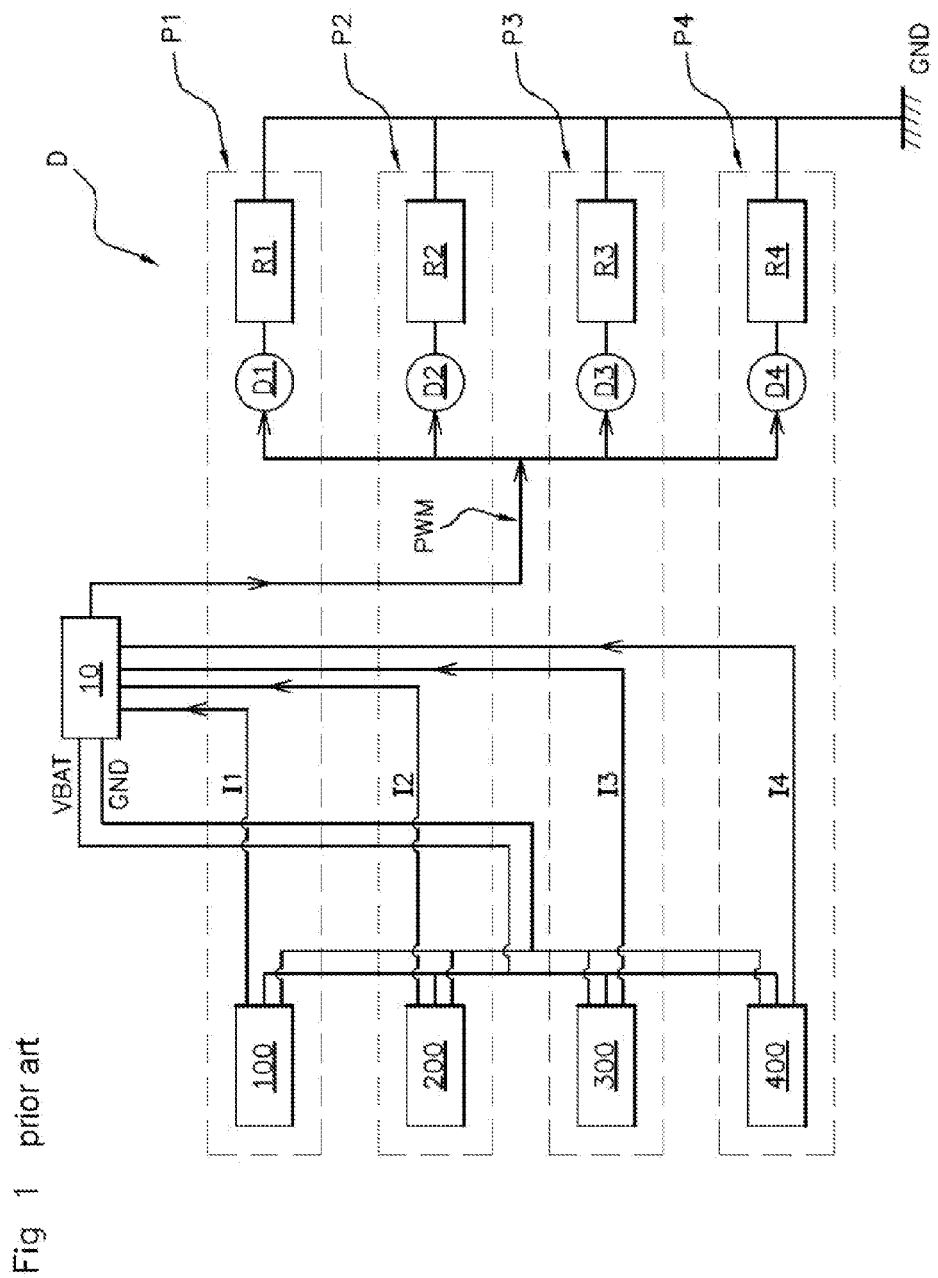
FIG. 1, as explained above, is a schematic representation of a lighting device D according to the prior art.

According to the invention (see FIG. 2), the lighting device D' carried on board a vehicle (not shown) includes:
- at least one light source controlled by a pulse-width modulated lighting signal PWM', corresponding in the present example to the four light-emitting diodes D1, D2, D3, D4,
- a body controller module 10 generating the pulse-width modulated lighting signal PWM', connected electrically:
  - to the four diodes D1, D2, D3, D4,
  - to at least one sensor for detecting the approach and/or contact of the user's hand, in the present example, to the four approach and/or contact detection sensors 100, 200, 300, 400 arranged in parallel.

According to the invention, the lighting device D' also includes switching means S1, S2, S3, S4, for example in the form of switches (see FIG. 2) arranged between the control means 102, 202, 302, 402 and the light sources D1, D2, D3, D4.

The approach and/or contact detection sensors 100, 200, 300, 400 include:
- receiving and processing means 101, 201, 301, 401 receiving the pulse-width modulated lighting signal PWM' from the body controller module 10,
- control means 102, 202, 302, 402 linked electrically
  - firstly to the receiving and processing means 101, 201, 301, 401, and
  - secondly to a light source D1, D2, D3, D4 via switching means S1, S2, S3, S4.

Thus, according to the invention, each approach and/or contact detection sensor 100, 200, 300, 400:
- receives the lighting signal PWM' from the body controller module 10, and
- is linked electrically to a light source D1, D2, D3, D4, to control it, via switching means S1, S2, S3, S4.

The receiving and processing means 101, 201, 301, 401 and the control means 102, 202, 302, 402 may be built into a microcontroller of the approach and/or contact detection sensor 100, 200, 300, 400. They may also be provided in software form.

Each set comprising a presence detection sensor 100, 200, 300, 400, a diode D1, D2, D3, D4 and related switching means S1, S2, S3, S4 is built into a vehicle door handle P1, P2, P3, P4.

As in the prior art, the body controller module 10 powers (VBAT, GND) the approach detection sensors 100, 200, 300, 400 and receives, as feedback from these latter, information I1, I2, I3, I4 relating to detection of the approach of a user near the locking/unlocking zones.

According to the invention, however, on receipt of this information I1, I2, I3, I4, the body controller module 10 sends a pulse-width modulated lighting signal PWM' of pulse frequency Fi not only to the diodes D1, D2, D3, D4 but also to the receiving and processing means 101, 201, 301, 401 incorporated into the approach and/or contact detection sensors 100, 200, 300, 400. This lighting signal PWM' may be identical to the lighting signal PWM in the prior art (see FIG. 3) and is illustrated in FIG. 4a. An impulse Imp of this lighting signal PWM' is defined (see FIG. 4a), as in the prior art, by a succession involving a change from a low state (0%) to a high state (100%) and the change from a high state (100%) to a low state (0%).

According to a first embodiment of the invention, the approach detection sensor 100, 200, 300, 400, the diode D1, D2, D3, D4 and the related switching means S1, S2, S3, S4 may be included in a dedicated approach and/or contact detection module (not shown) built into a vehicle door handle P1, P2, P3, P4 or directly built into the handle (no module). In the example given, the vehicle therefore includes four modules divided between the four door handles P1, P2, P3, P4.

Since the luminous intensities of these four light-emitting diodes D1, D2, D3, D4 are different, the invention proposes modifying the intensity of the lighting signal PWM' passing through each diode D1, D2, D3, D4 using switching means S1, S2, S3, S4 associated with said diodes in order to obtain substantially the same luminous intensity for all the diodes.

As shown in FIG. 4b, activating the switching means, for example the switch S1, at a switching frequency Fc greater than the pulse frequency Fi, modifies the lighting signal PWM1 passing through the first diode D1 in relation to the lighting signal PWM' outputted from the body controller module 10. Effectively, additional interruptions Com are created in the lighting signal PWM'. The signal PWM1 thus created and passing through said first diode D1 is then at a lower intensity than the lighting signal PWM' outputted from the body controller module 10.

By selecting the correct switching frequency Fc and a duty cycle of these switches Rci (i.e. the ratio between the duration of the high states and the duration of the low states of the interruptions Com), the intensity of this signal PWM1 passing through the first diode D1 can thus be lowered to a desired intensity value. This lowers the luminous intensity of the first diode D1 to a desired luminous intensity value. The switching frequency $F_C$ and the duty cycle of the switches Rci for a desired luminous intensity are determined during a prior calibration phase, detailed below.

It should be noted that activation of the switching means S1, S2, S3, S4 only enables the intensity of the lighting signal PWM' to be reduced, i.e. lowered. Indeed, the switching means S1, S2, S3, S4 create additional interruptions Com (see Z1 In FIG. 4b) only when the lighting signal PWM' is in the high state (100%) (i.e. when the signal is not zero) thereby superposing themselves on the existing pulses Imp of the lighting signal PWM', which lowers the intensity of this lighting signal PWM' (the switching means S1, S2, S3, S4 can naturally also be activated during the low-state periods of the lighting signal PWM', but the interruptions Com have no effect on the intensity of the lighting signal PWM' in this case, this being at zero intensity, 0%).

The switching frequency Fc and the duty cycle of the switches Rci are determined for each diode D1, D2, D3, D4, during a prior calibration phase, then stored in each processing means 101, 201, 301, 401 associated with a diode D1, D2, D3, D4.

This prior calibration phase includes the following steps:
e) Determination of a desired luminous intensity value,
f) Measurement, at a reference power supply voltage value Vref, of a luminous intensity for each diode D1, D2, D3, D4 from a plurality of diodes (for example from a production lot of diodes), as a function of the variation of the switching frequency Fc and of the variation of the switching duty cycle Rci of the lighting signal PWM',
g) Storage in the receiving and processing means 101, 102, 103, 104 associated with each diode D1, D2, D3, D4 of a given switching frequency Fc and of a given switching duty cycle Rci to obtain the desired luminous intensity.

The reference voltage Vref is for example 12 V.

In a preferred embodiment, the desired luminous intensity is the lowest luminous intensity measured from the plurality of diodes, i.e. for example the lowest luminous intensity measured on the diode production line, or measured in a lot of diodes, or taken from the measurement of the four diodes D1, D2, D3, D4 fitted to the vehicle.

This calibration phase may be carried out during production of the module including the approach and/or contact detection sensor 100, 200, 300, 400, the related diode D1, D2, D3, D4, and the related switch S1, S2, S3, S4. The module (and the related diode) is first energized, then the luminous intensity of the diode D1, D2, D3, D4 is measured as a function of the variation of the switching frequency Fc and of the variation of the switching duty cycle Rci of the lighting signal PWM'. This phase is repeated for the four modules (i.e. four diodes) fitted to the vehicle or for the entire lot of modules coming off the related production line. The lowest measured luminous intensity is determined, and for each diode D1, D2, D3, D4, the switching frequency Fc and the switching duty cycle Rci are then calibrated, i.e. adjusted to obtain the desired lowest luminous intensity. These values are then stored in the receiving and processing means 101, 201, 301, 401 of said module.

FIG. 4c shows an example signal PWM4 passing through the fourth diode D4, following modification of the lighting signal PWM' using the switch S4.

This example is based on the assumption that the luminous intensity of the fourth diode D4 measured during the calibration phase is greater than that of the first diode D1.

The signal PWM4 passing through the fourth diode D4 has more interruptions Com than the signal PWM1 passing through the first diode D1 (see Z4 in FIG. 4c). Indeed, the intensity of the lighting signal PWM' needs to be further lowered to ensure the luminous intensity of these two diodes D1, D4 is the same.

The example is limited to the signal PWM1 passing through the first diode D1 and to the signal PWM4 passing through the fourth diode D4. It is assumed that the luminous intensities of the second and third diodes D2 and D3 are of minimum value and do not need to be corrected using the switch S2 and S3 related thereto.

As explained in the prior art, the body controller module 10 centralizes all of the information coming from the approach and/or contact detection sensors 100, 200, 300, 400 on the vehicle regarding the illumination and/or extinguishing of the diodes D1, D2, D3, D4. The invention therefore proposes keeping the signal PWM' coming from the body controller module 10 identical to that found in the prior art, and modifying neither the form of the signal nor the logic in the body controller module 10 resulting in transmission of this signal PWM'. However, this lighting signal PWM' is then modified by the lighting device of the invention for each diode D1, D2, D3, D4 via the approach and/or contact detection sensor 100, 200, 300, 400 and the related switches S1, S2, S3, S4.

Thus, according to the invention, the control means 102, 202, 302, 402 built into each approach and/or contact detection sensor 100, 200, 300, 400 via the switching means S1, S2, S3, S4 adjust the luminous intensity passing through the light-emitting diodes D1, D2, D3, D4.

Thus, according to the invention, the control method of the diodes D1, D2, D3, D4 includes the following steps:
a) Storage in the receiving and processing means 101, 102, 103, 104 associated with each diode D1, D2, D3, D4 of a given switching frequency Fc and of a given switching duty cycle Rci to obtain the desired luminous intensity.
b) Transmission by the body controller module 10 to the receiving and processing means 101, 102, 103, 104 of the approach and/or contact detection sensor or sensors 100, 200, 300, 400 and to the light source or sources D1, D2, D3, D4 of a pulse-width modulated lighting signal PWM' having a pulse frequency Fi, and a rated voltage Vn,
c) Receipt of the lighting signal PWM' by the receiving and processing means 101, 102, 103, 104,
d) Activation of the switching means S1, S2, S3, S4 by the control means 102, 202, 302, 402, according to the switching frequency Fc and switching duty cycle Rci stored in step a in order to set the light source or sources D1, D2, D3, D4 to the desired luminous intensity.

In a first embodiment of the control method, the rated voltage Vn of the body controller module 10 is equal to the reference power voltage Vref of the calibration method.

In a second embodiment, the rated voltage Vn of the body controller module 10 is different to the reference power voltage Vref of the calibration method.

Indeed, as the rated voltage Vn powering the body controller module 10 is the voltage outputted from the battery of the vehicle VBAT, it generally varies between 8 V and 16 V. It is therefore necessary to take account of these voltage differences and to adjust the switching frequency Fc and the switching duty cycle Rci accordingly, since these were determined at the reference voltage Vref used during the calibration phase, which is around 12 V. Consequently, in this second embodiment, during step c, the rated voltage Vn is measured by the receiving and processing means 101, 201, 301, 401 and the switching frequency Fc and the switching duty cycle Rci, stored in the receiving and processing means 101, 201, 301, 401, are recalculated by these latter at the rated voltage value Vn.

The switching means S1, S2, S3, S4 are then activated at this switching frequency Fc and this duty cycle Rci calculated at the rated voltage Vn, and the diode D1, D2, D3, D4 is illuminated or extinguished as appropriate with the desired luminous intensity.

The invention enables the approach and/or contact detection sensor 100, 200, 300, 400 to modify the luminous intensity of each light-emitting diode D1, D2, D3, D4 paired with it using simple and cheap switching means S1, S2, S3, S4 such as switches located in the same module or in the handle itself. Since the processing means 101, 201, 301, 401 and the control means 102, 202, 302, 402 can be software means, the invention enables the diodes D1, D2, D3, D4 to have substantially equal luminous intensity on a given vehicle at low cost.

Naturally, the invention is not limited to the embodiments described, which are given solely by way of nonlimiting examples. For example, the invention applies to all actuators located in the door handle of a vehicle or in the vicinity thereof that can be controlled by a pulse-width modulated signal coming from a body module via any sensor or system linked to the body module and to this actuator using the switching means of the signal.

The invention claimed is:

1. A lighting device carried on board a motor vehicle, said device comprising:
   at least two light sources controlled by a pulse-width modulated lighting signal;
   a body controller module generating the pulse-width modulated lighting signal, connected electrically to the light sources and to at least two sensors detecting the approach and/or contact of a hand of a user;
   a switching device located between each light source and the ground,
   wherein each approach and/or contact detection sensor includes:
      receiving and processing means receiving the pulse-width modulated lighting signal from the body controller module, and
      a controller configured to control the switching device connected to the receiving and processing means, and to one of the light sources via the switching device.

2. The lighting device according to claim 1, wherein the switching device includes a switch.

3. The lighting device according to claim 2, wherein the light sources are light-emitting diodes.

4. The lighting device according to claim 2, wherein the approach and/or contact detection sensor, the light source, and the switching device are built into a vehicle door handle.

5. The lighting device according to claim 2, wherein the receiving and processing means and the control device of the switching device are built into a microcontroller.

6. The lighting device according to claim 1, wherein the light sources are light-emitting diodes.

7. The lighting device according to claim 6, wherein the approach and/or contact detection sensor, the light source, and the switching device are built into a vehicle door handle.

8. The lighting device according to claim 6, wherein the receiving and processing means and the control device means of the switching device are built into a microcontroller.

9. The lighting device according to claim 1, wherein the approach and/or contact detection sensor, the light source, and the switching device are built into a vehicle door handle.

10. The lighting device according to claim 9, wherein the receiving and processing means and the control device means of the switching device are built into a microcontroller.

11. The lighting device according to claim 1, wherein the receiving and processing means and the control device of the switching device are built into a microcontroller.

12. A method for controlling a light source using a lighting device carried on board a motor vehicle, said device including:
   at least two light sources controlled by a pulse-width modulated lighting signal;
   a body controller module generating the pulse-width modulated lighting signal, connected electrically to the light sources and to at least two sensors detecting the approach and/or contact of a hand of a user; and
   a switching device located between each light source and the ground,
   each approach and/or contact detection sensor including
      receiving and processing means receiving the pulse-width modulated lighting signal from the body controller module, and
      a control device configured to control the switching device, connected to the receiving and processing means, and to one of the light sources via the switching device,
   the method comprising:
   using the receiving and processing means to store a switching frequency and a switching duty cycle of the lighting signal, both predetermined to obtain a desired luminous intensity;
   using the body controller module to send a pulse-width modulated lighting signal, having a pulse frequency and a rated voltage, to the processing means and to the light source;
   receiving the lighting signal by the receiving and processing means; and
   activating the switching device by the control device, according to the switching frequency and switching duty cycle stored in order to set the light source to the desired luminous intensity.

13. The method according to claim 12, wherein the switching frequency is higher than the pulse frequency.

14. The method according to claim 12, wherein the switching frequency is at least ten times greater than the pulse frequency.

15. The method according to claim 12, wherein the switching frequency and the pulse duty cycle are determined during a prior calibration phase comprising:
   determining a desired luminous intensity value,
   measuring, at a reference power supply voltage value, a luminous intensity for each light source from a plurality of light sources as a function of the variation of the switching frequency and of the variation of the switching duty cycle of the lighting signal; and
   storing, in the receiving and processing means associated with each light source, a given switching frequency and a given switching duty cycle to obtain the desired luminous intensity.

16. The method according to claim 15, wherein the desired luminous intensity is equal to the lowest luminous intensity measured from the plurality of light sources.

17. The method according to claim 15, wherein the receiving the lighting signal includes correcting, at the rated voltage value, the switching frequency and the switching duty cycle determined during the measuring the luminous intensity as a function of the reference power supply voltage value.

18. The method according to claim 12,
   wherein the switching means includes a switch.

19. The method according to claim 12,
   wherein the light sources are light-emitting diodes.

20. The method according to claim 12,
   wherein the approach and/or contact detection sensor, the light source, and the switching means are built into a vehicle door handle.

* * * * *